United States Patent
Hsieh et al.

(10) Patent No.: US 9,378,355 B2
(45) Date of Patent: Jun. 28, 2016

(54) ELECTRONIC DEVICE AND ACCESS CONTROLLING METHOD

(71) Applicant: Chiun Mai Communication Systems, Inc., New Taipei (TW)

(72) Inventors: Chung-Kai Hsieh, New Taipei (TW); Lun-Yuan Tsai, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/482,878

(22) Filed: Sep. 10, 2014

(65) Prior Publication Data

US 2015/0116240 A1   Apr. 30, 2015

(30) Foreign Application Priority Data

Oct. 24, 2013   (CN) .......................... 2013 1 0507469

(51) Int. Cl.
*G06F 3/048*   (2013.01)
*G06F 21/36*   (2013.01)
*G06F 3/0488*   (2013.01)
*G09G 5/00*   (2006.01)

(52) U.S. Cl.
CPC ............ *G06F 21/36* (2013.01); *G06F 3/04883* (2013.01); *G09G 5/003* (2013.01)

(58) Field of Classification Search
CPC .............................. G06F 21/36; G06F 3/04883
USPC .......................................................... 345/173
See application file for complete search history.

(56) References Cited

U.S. PATENT DOCUMENTS

| 8,621,396 | B1 * | 12/2013 | Gossweiler, III | ..... G06F 3/0488 713/183 |
| 2009/0249476 | A1 * | 10/2009 | Seacat | ..................... G06F 21/31 726/17 |
| 2014/0092039 | A1 * | 4/2014 | Ito | ........................... G06F 21/36 345/173 |

* cited by examiner

*Primary Examiner* — Ariel Balaoing
(74) *Attorney, Agent, or Firm* — ScienBiziP, P.C.

(57) ABSTRACT

A method for controlling access to an electronic device, the electronic device displays an image on a display device of the electronic device, when the electronic device is locked. The electronic device obtains a pattern according to touch signals on the displayed image using an image-recognition algorithm. Once a similarity degree between the obtained pattern and a predetermined pattern is greater than or equal to a predetermined value, the electronic device is unlocked.

9 Claims, 7 Drawing Sheets

ELECTRONIC DEVICE AND ACCESS CONTROLLING METHOD

CROSS-REFERENCE TO RELATED APPLICATIONS

This application claims priority to Chinese Patent Application No. 201310507469.X filed on Oct. 24, 2013 in the China Intellectual Property Office, the contents of which are incorporated by reference herein.

FIELD

Embodiments of the present disclosure relate to access control technology, and more particularly to an electronic device and a method for controlling access to the electronic device.

BACKGROUND

An electronic device (e.g., a mobile phone) may be locked using a password. When the electronic device is locked, the user wants the password that is not easy to break, to keep the electronic device is in a safe state to avoid information leakage.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
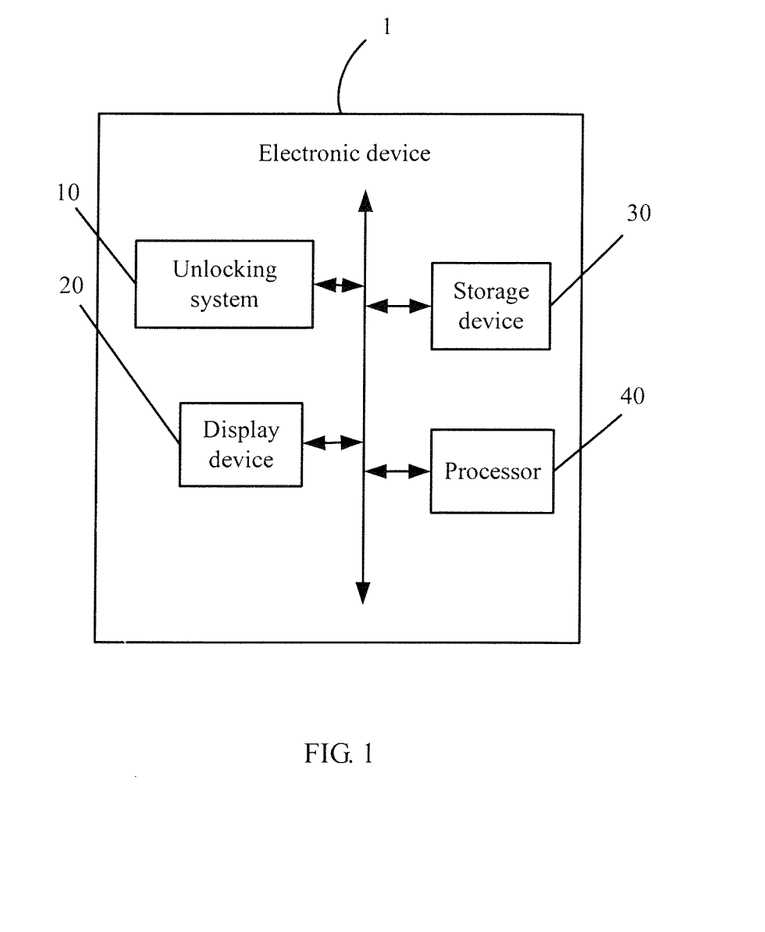
FIG. 1 is a block diagram of one embodiment of an electronic device including an unlocking system.

FIG. 1 is a block diagram of one embodiment of an electronic device 1 including an unlocking system 10. The electronic device 1 further includes a display device 20, a storage device 30, and at least one processor 40.

The electronic device 1 may be a mobile phone, a personal digital assistant (PDA), or any other computing device. It should be understood that FIG. 1 illustrates merely one example of the electronic device 1. The electronic device 1 may include more or fewer components than illustrated, or have a different configuration of various components in other embodiments.

In some embodiments, the display device 20 is a touch panel, which supports multi-touch, such as a resistive touch screen or a capacitive touch screen, for example. The storage device 30 stores different kinds of data, such as images, videos, and messages, for example. In one embodiment, the images may be photos of a user which are captured by a camera (not shown in FIG. 1) of the electronic device 1. In other embodiments, the images may be downloaded from the Internet.

The unlocking system 10 is used to control access to the electronic device 1. Details will be given as follows.

Figure 2:
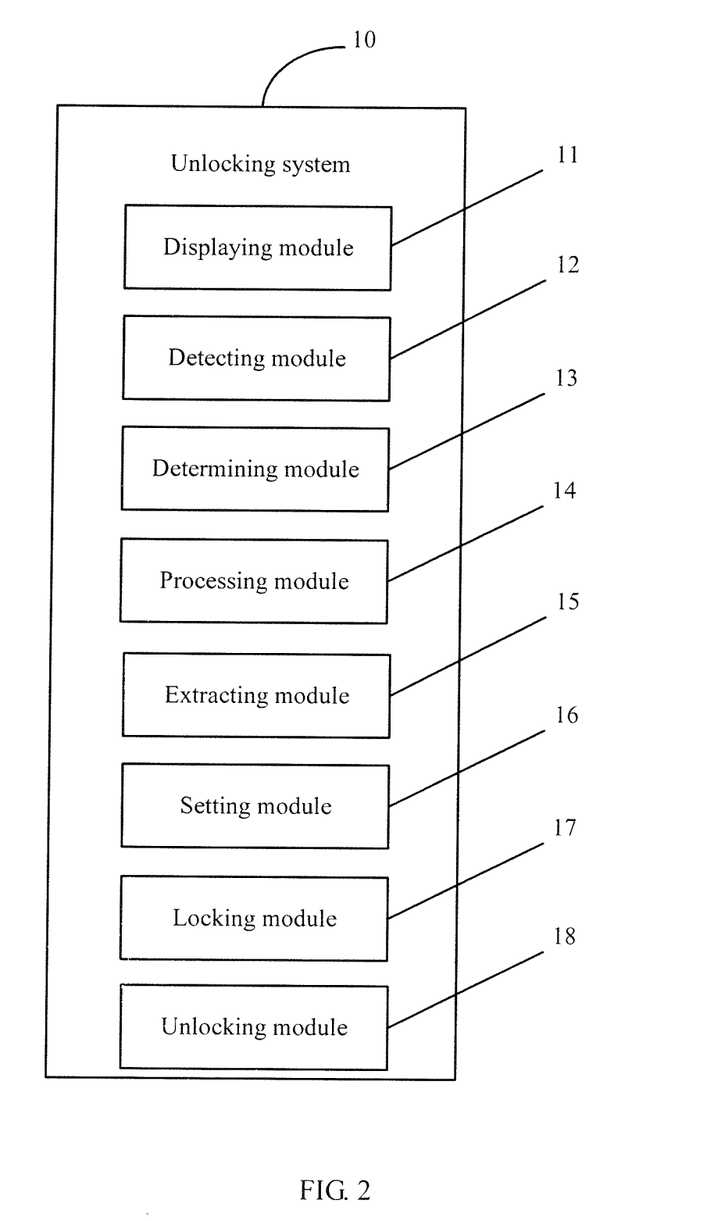
FIG. 2 is a block diagram of function modules of the unlocking system included in the electronic device of FIG. 1.

FIG. 2 is a block diagram of function modules of the unlocking system 10 in the electronic device 1. In one embodiment, the unlocking system 10 may include computerized instructions in the form of one or more programs that are executed by the at least one processor 40 and stored in the storage device 30. For example, the unlocking system 10 includes a displaying module 11, a detecting module 12, a determining module 13, a processing module 14, an extracting module 15, a setting module 16, a locking module 17, and an unlocking module 18.

Figure 3:
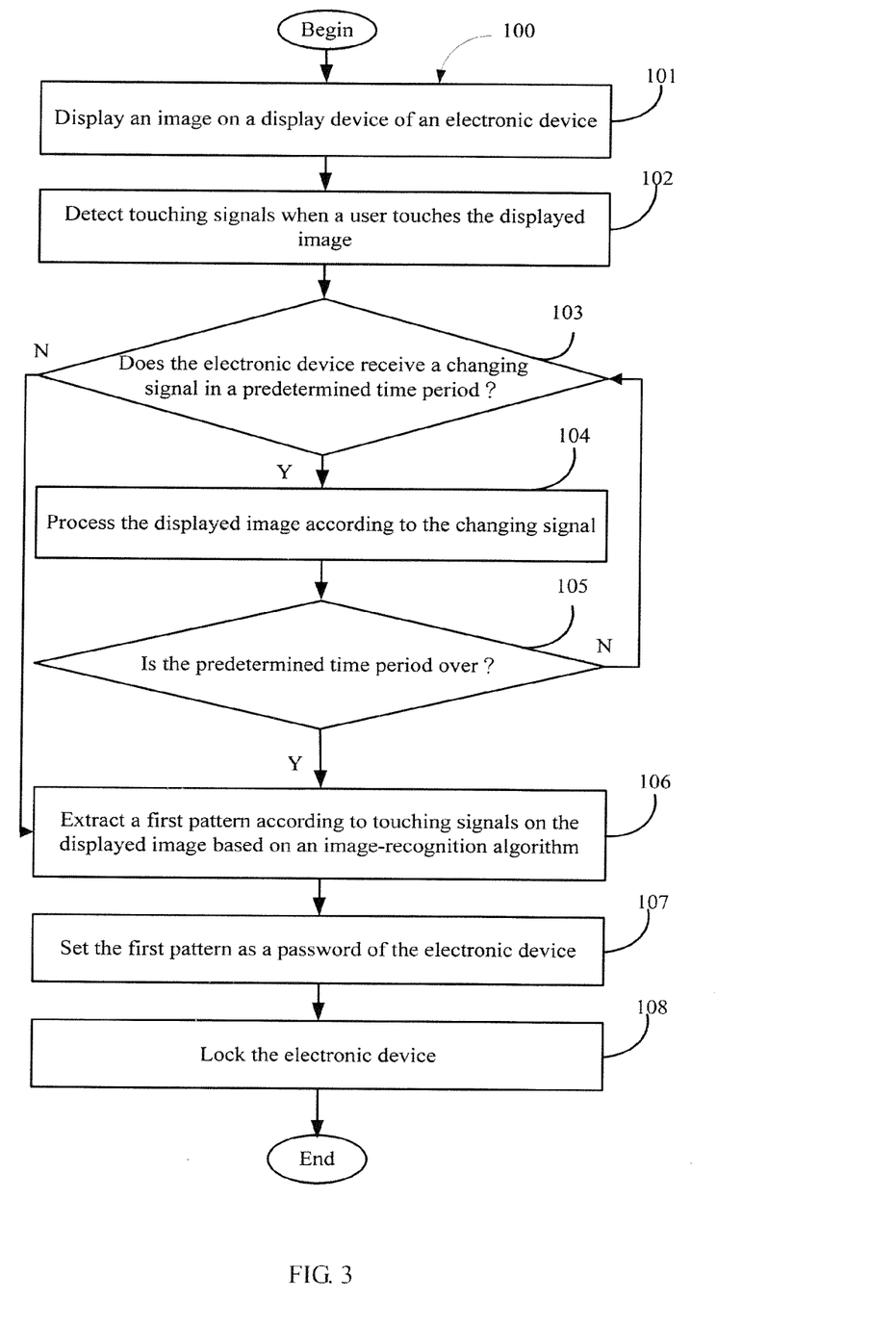
FIG. 3 is a flowchart of one embodiment of a method for locking the electronic device of FIG. 1.

FIG. 3 is a flowchart of one embodiment of a method of setting a password for unlocking the electronic device 1. The example method 100 is provided by way of example, as there are a variety of ways to carry out the method. The method 100 described below can be carried out using the configurations illustrated in FIGS. 1, and 2, for example, and various elements of these figures are referenced in explaining example method 100. Each block shown in FIG. 3 represents one or more processes, methods or subroutines, carried out in the exemplary method 100. Additionally, the illustrated order of blocks is by example only and the order of the blocks can be changed according to the present disclosure. The exemplary method 100 can begin at block 101. Depending on the embodiment, additional steps may be added, others removed, and the ordering of the steps may be changed.

In block 301, the displaying module 11 obtains an image from the storage device 30, and displays the image on the display device 20.

Figure 4:
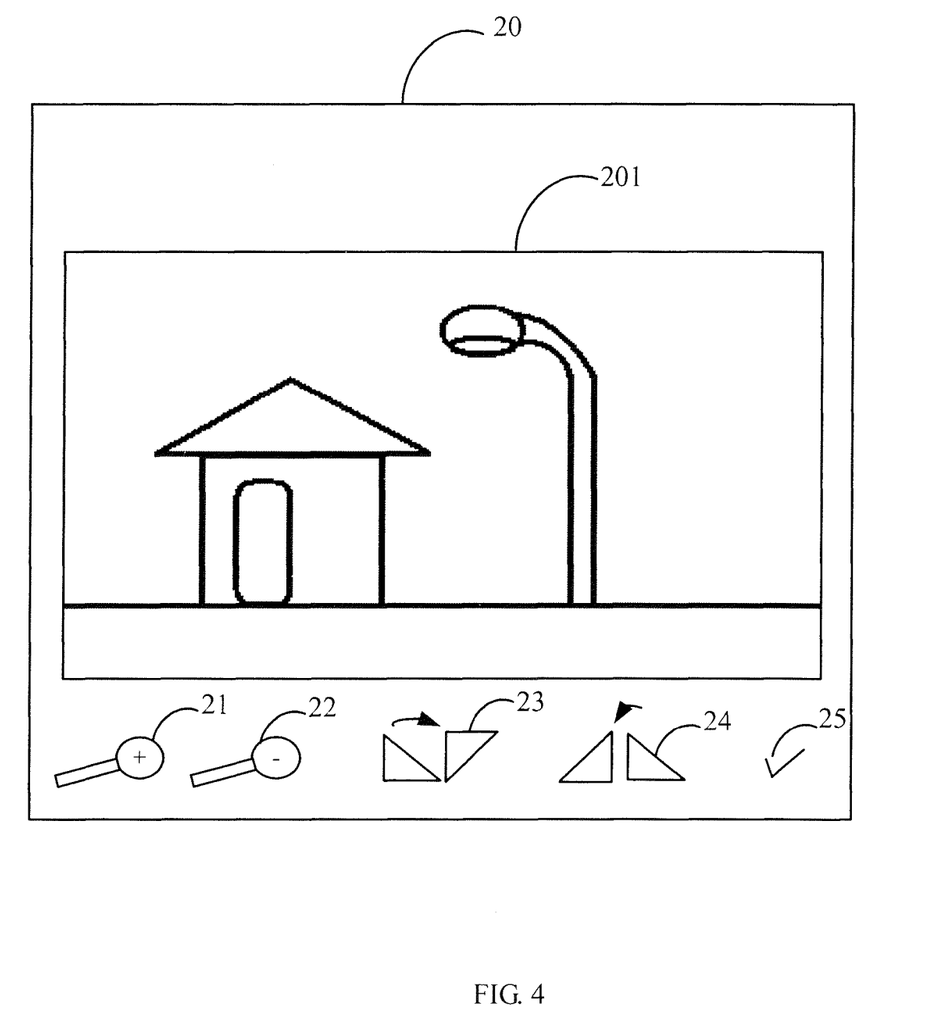
FIG. 4 illustrates one example of the electronic device displays an image.

For example, as shown in FIG. 4, the displaying module 11 displays an image 201 on the display device 20.

In block 302, the detecting module 12 detects touching signals on the displayed image according to touch operations of a user.

In block 303, the determining module 13 determines whether the electronic device 1 receives any change signals for changing the displayed image in a predetermined time period (e.g., 3, 5, or 10 seconds). If the electronic device 1 receives the change signals in the predetermined time period, the process goes to block 304. If the electronic device 1 does not receive any change signal in the predetermined time period, the process goes to block 306.

In one embodiment, the change signals include, but are not limited to a first signal of enlarging the displayed image, a second signal of reducing the displayed image, a third signal of rotating the displayed image clockwise, and/or a fourth signal of rotating the displayed image counter-clockwise.

In one embodiment, the change signals are input by hand gestures of the user. For example, when a distance between two fingers of the user on the display device 20 is increased, the determining module 13 determines that the first signal is received. When the distance between the two fingers of the user on the display device 20 is decreased, the determining module 13 determines that the second signal is received.

When one finger of the user rotates clockwise on the display device 20 with a degree, which is greater than or equal to a first predetermined value, the determining module 13 determines the third signal is received. When one finger of the user rotates counter-clockwise on the display device 20 with the degree, the determining module 13 determines the fourth signal is received. In other embodiments, for facilitating the user using the electronic device 1, the change signals can be input by clicking or pressing a predetermined control icon displayed on the display device 20. For example, the determining module 13 displays four control icons on the display device 20, to receive the four kinds of signals as mentioned above. In one embodiment, the determining module 13 displays the four control icons on the bottom end of the display device 20 as shown in FIG. 4.

In one embodiment, the four control icons include a first icon 21 which is used to receive the first signal, a second icon 22 which is used to receive the second signal, a third icon 23 which is used to receive the third signal, and a fourth icon 24 which is used to receive the fourth signal.

For example, when the user touches the first icon 21, the determining module 13 determines that the electronic device 1 receives the first signal. Similarly, when the user touches the second icon 22, the determining module 13 determines that the electronic device 1 receives the second signal. When the user touches the third icon 23, the determining module 13 determines that the electronic device 1 receives the third signal. When the user touches the fourth icon 24, the determining module 13 determines that the electronic device 1 receives the fourth signal.

In block 304, the processing module 14 processes the displayed image according to the change signals. For example, when the electronic device 1 receives the first signal in the predetermined time period, the processing module 14 enlarges the displayed image with a predetermined percentage, based on an intersection point of diagonals of the displayed image.

Similarly, when the electronic device 1 receives the second signal in the predetermined time period, the processing module 14 reduces the displayed image with the predetermined percentage, based on the intersection point of diagonals of the displayed image. When the electronic device 1 receives the third signal in the predetermined time period, the processing module 14 rotates the displayed image clockwise with the predetermined degree, based on the intersection point of diagonals of the displayed image. When the electronic device 1 receives the fourth signal in the predetermined time period, the processing module 14 rotates the displayed image counter-clockwise with the predetermined degree, based on the intersection point of diagonals of the displayed image.

Figure 6A:
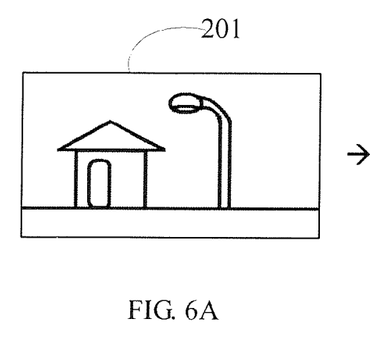
FIG. 6A to FIG. 6E illustrate one example of obtaining a first pattern on the displayed image.

For example, as shown in FIG. 6A, the displaying module 11 displays the image 201 on the display device 20. When the user touches the first icon 21 or the distance between two fingers of the user on the image 201 is increased in the predetermined time period, the processing module 14 enlarges the image 201 with the predetermined percentage based on the intersection point of diagonals of the image 201, and obtains an image 2011 as shown in FIG. 6B.

In block 305, the determining module 13 determines whether the predetermined time period elapses. If the predetermined time period elapses, the process goes to block 306. If the predetermined time period does not elapse, the process returns to block 303.

It should be noted that, when the process returns to block 303, if the electronic device 1 receives other change signals in the predetermined time period, the processing module 14 process the current image displayed on the display device 20, according to newly received change signal.

Figure 6B:
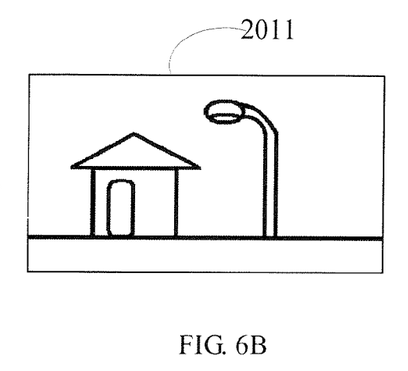
Figure 6C:
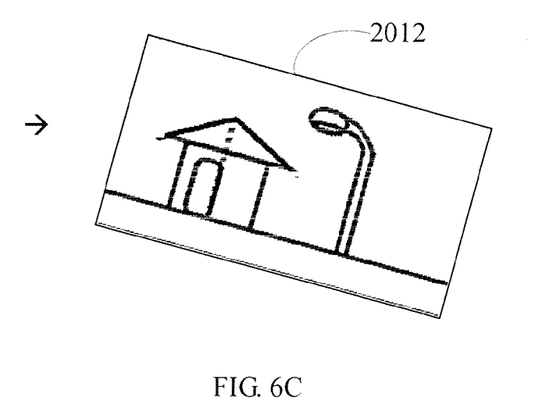

For example, as shown in FIG. 6B, the current image displayed on the display device 20 is the image 2011, if the electronic device 1 further receives the third signal in the predetermined time period, then the processing module 14 rotates the image 2011 clockwise with the predetermined degree based on the intersection point of diagonals of the image 2011, and obtains an image 2012 as shown in FIG. 6C.

In block 306, the extracting module 15 extracts a first pattern according to touching signals on the displayed image based on an image-recognition algorithm.

In this embodiment, the extracting module 15 firstly determines touching areas according to the touch signals detected by the detecting module 12, and then extracts an image feature corresponding to each of the touch areas. The extracting module 15 further sequentially connects each image feature according to a touch sequence, to obtain the first pattern. In one embodiment, the image feature includes characteristic of geometry.

In one embodiment, for facilitating the user using the electronic device 1, the extracting module 15 displays a fifth icon 25 (as shown in FIG. 4) on the display device 20, the fifth icon 25 is used to enable the extracting module 15 to begin to extract the first pattern, according to the touching signals.

Figure 6D:
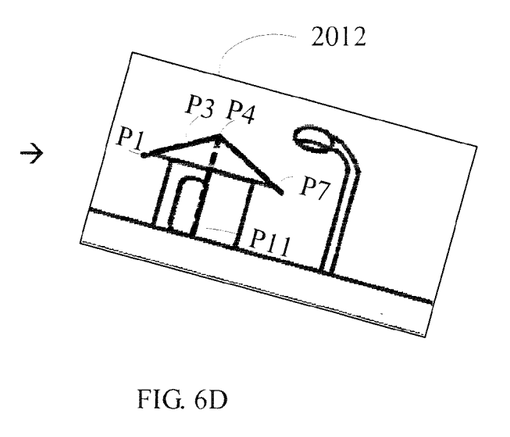

For example, as shown in FIG. 6C, the current image displayed on the display device 20 is the image 2012. When the user finishes touching the image 2012, and then presses the fifth icon 25, the extracting module 15 begins to extract the first pattern. For example, the extracting module 15 firstly determines the touching areas P1-P11 as shown in FIG. 6D (only P1, P3, P4, P7, and P11 indicated) according to the touching signals detected by the detecting module 12.

Figure 6E:
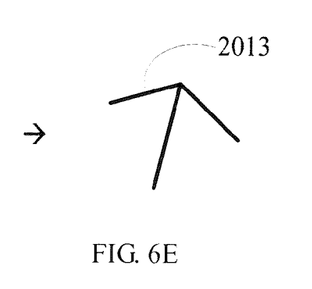

Then the extracting module 15 extracts a line segment corresponding to each of the touch areas P1-P11. The extracting module 15 further sequentially connects the line segment corresponding to P1-P11 according to the touch sequence, and obtains the first pattern 2013 as shown in FIG. 6E.

In block 307, the setting module 16 sets the first pattern as a password of the electronic device 1, and stores the first pattern into the storage device 30.

In block 308, the locking module 17 locks the electronic device 1. For example, the locking module 17 locks the electronic device 1 when the electronic device 1 is in a standby state for 10 minutes.

Figure 5:
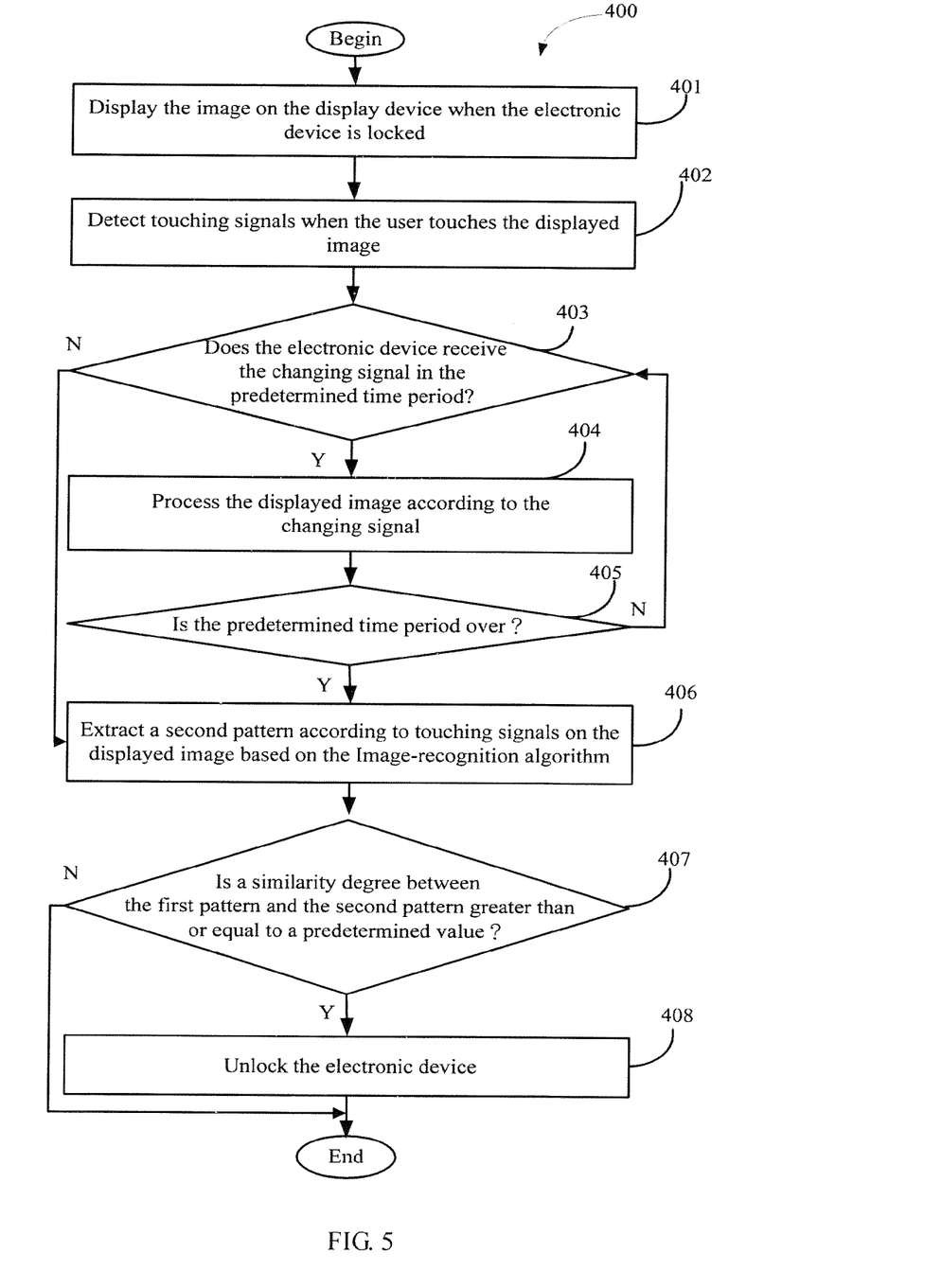
FIG. 5 is a flowchart of one embodiment of a method for unlocking the electronic device of FIG. 1.

FIG. 5 is a flowchart of one embodiment of a method for unlocking the electronic device of FIG. 1. The example method 400 is provided by way of example, as there are a variety of ways to carry out the method. The method 400 described below can be carried out using the configurations illustrated in FIGS. 1, and 2, for example, and various elements of these figures are referenced in explaining example method 400. Each block shown in FIG. 5 represents one or more processes, methods or subroutines, carried out in the exemplary method 400. Additionally, the illustrated order of blocks is by example only and the order of the blocks can be changed according to the present disclosure. The exemplary method 400 can begin at block 401. Depending on the embodiment, additional steps may be added, others removed, and the ordering of the steps may be changed.

In block 401, the displaying module 11 displays the image on the display device 20, when the electronic device 1 receives a wake-up signal in a locking state.

For example, as shown in FIG. 4, the displaying module 11 displays the image 201 on the display device 20.

In block 402, the detecting module 12 detects touching signals when the user touches the displayed image.

In block 403, the determining module 13 determines whether the electronic device 1 receives any change signals for changing the displayed image in the predetermined time period (e.g., 3, 5, or 10 seconds). If the electronic device 1 receives the change signals in the predetermined time period, the process goes to block 404. If the electronic device 1 does not receive any change signal in the predetermined time period, the process goes to block 406.

As mentioned above, the change signals include the first signal of enlarging the displayed image, the second signal of reducing the displayed image, the third signal of rotating the displayed image clockwise, and the fourth signal of rotating the displayed image counter-clockwise.

As mentioned above, the change signals may be input by hand gesture, or pressing on the predetermined control icon on the display device 20.

In block 404, the processing module 14 processes the displayed image according to the change signals. For example, when the electronic device 1 receives the first signal in the predetermined time period, the processing module 14 enlarges the displayed image 201 with the predetermined percentage, based on the intersection point of diagonals of the displayed image 201.

In block 405, the determining module 13 determines whether the predetermined time period elapses. If the predetermined time period elapses, the process goes to block 406, if the predetermined time period does not elapse, the process returns to block 403.

As mentioned above, when the process returns to block 403, if the electronic device 1 receives the change signals in the predetermined time period, the processing module 14 processes the current image displayed on the display device 20, according to the newly received change signal.

In block 406, the extracting module 15 extracts a second pattern according to touching signals on the displayed image based on the image-recognition algorithm.

It should be noted that, the extracting module 15 extracts the second pattern using a same extraction method as mentioned above, for extracting the first pattern.

Figure 7A:
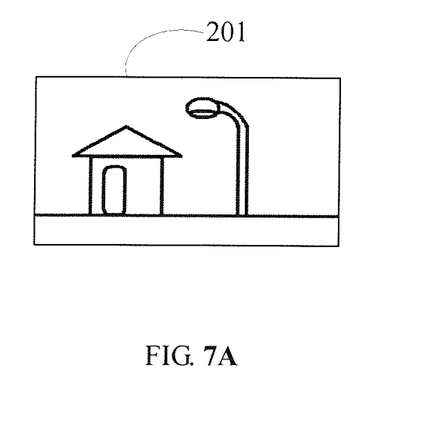
FIG. 7A to FIG. 7C illustrate one example of obtaining a second pattern on the displayed image.
Figure 7B:
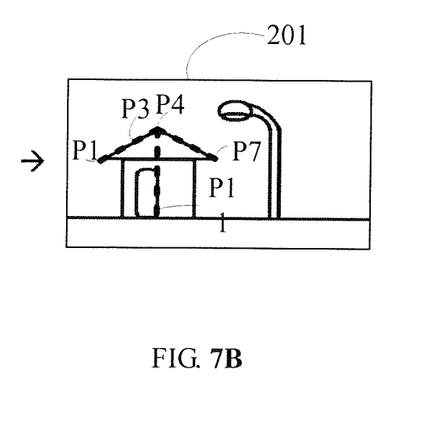

For example, as shown in FIG. 7A, the current image displayed on the display device 20 is the image 201. When the user touches the image 201, and then touches the fifth icon 25, the extracting module 15 begins to extract the second pattern. For example, the extracting module 15 firstly determines the touching areas P1-P11 as shown in FIG. 7B (only P1, P3, P4, P7, and P11 indicated) according to the touching signals detected by the detecting module 12.

Figure 7C:
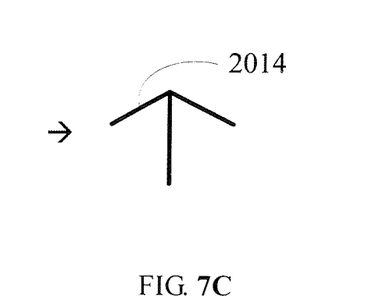

Then the extracting module 15 extracts the line segment corresponding to each of the touch areas P1-P11. The extracting module 15 further sequentially connects the line segments corresponding to P1-P11 according to the touch sequence, and obtains the second pattern 2014 as shown in FIG. 7C.

In block 407, the determining module 13 determines whether a similarity degree between the first pattern and the second pattern is greater than or equal to a second predetermined value (e.g., 90%). If the similarity degree is greater than or equal to the second predetermined value, the process goes to block 408. If the similarity degree is less than the second predetermined value, the process ends.

For example, if the determining module 13 determines that the similarity degree between the first pattern 2013 and the second pattern 2014 is greater than or equal to the second predetermined value, the process goes to block 408.

In block 408, the unlocking module 18 unlocks the electronic device 1.

It should be emphasized that the above-described embodiments of the present disclosure, particularly, any embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure is protected by the following claims.

What is claimed is:

1. An electronic device comprising:
a display device;
at least one processor; and
a storage device storing a plurality of instructions, which when executed by the at least one processor, cause the at least one processor to:
display an image on the display device when the electronic device is locked;
obtain a pattern according to touch signals on the displayed image based on an image-recognition algorithm, wherein the pattern is obtained by:
determining touch areas according to the touch signals on the displayed image;
extracting an image feature corresponding to each of the touch areas; and
obtaining the pattern by sequentially connecting each image feature according to a touch sequence; and
unlock the electronic device when a similarity degree between the obtained pattern and a predetermined pattern is greater than or equal to a predetermined value.

2. The electronic device according to claim 1, wherein the processor further processes the displayed image according to change signals that are received by the electronic device in a predetermined time period, the change signals comprising a first signal of enlarging the displayed image, a second signal of reducing the displayed image, a third signal of rotating the displayed image clockwise, and/or a fourth signal of rotating the displayed image counter-clockwise.

3. The electronic device according to claim 1, wherein the image feature comprises characteristic of geometry.

4. A computer-implemented method for controlling access to an electronic device being executed by a processor of the electronic device, the electronic device comprising a display device, the method comprising:

displaying an image on the display device, when the electronic device is locked;

obtaining a pattern according to touch signals on the displayed image based on an image-recognition algorithm, wherein the pattern is obtained by:

determining touch areas according to the touch signals on the displayed image;

extracting an image feature corresponding to each of the touch areas; and obtaining the pattern by sequentially connecting each image feature according to a touch sequence; and unlocking the electronic device when a similarity degree between the obtained pattern and a predetermined pattern is greater than or equal to a predetermined value.

5. The method according to claim 4, further comprising:

processing the displayed image according to change signals that are received by the electronic device in a predetermined time period, the change signals comprising a first signal of enlarging the displayed image, a second signal of reducing the displayed image, a third signal of rotating the displayed image clockwise, and/or a fourth signal of rotating the displayed image counter-clockwise.

6. The method according to claim 4, wherein the image feature comprises characteristic of geometry.

7. A non-transitory storage medium having stored thereon instructions that, when executed by a processor of an electronic device, causes the electronic device to perform a method for controlling access to the electronic device, the electronic device comprising a display device, the method comprising:

displaying an image on the display device, when the electronic device is locked;

obtaining a pattern according to touch signals on the displayed image based on an image-recognition algorithm, wherein the pattern is obtained by:

determining touch areas according to the touch signals on the displayed image;

extracting an image feature corresponding to each of the touch areas; and obtaining the pattern by sequentially connecting each image feature according to a touch sequence; and unlocking the electronic device when a similarity degree between the obtained pattern and a predetermined pattern is greater than or equal to a predetermined value.

8. The non-transitory storage medium according to claim 7, wherein the method further comprises:

processing the displayed image according to change signals that are received by the electronic device in a predetermined time period, the change signals comprising a first signal of enlarging the displayed image, a second signal of reducing the displayed image, a third signal of rotating the displayed image clockwise, and/or a fourth signal of rotating the displayed image counter-clockwise.

9. The non-transitory storage medium according to claim 7, wherein the image feature comprises characteristic of geometry.

* * * * *